United States Patent
Villarreal-Reyes

(10) Patent No.: US 9,278,278 B1
(45) Date of Patent: *Mar. 8, 2016

(54) "2×3" MATH LEARNING GAME

(71) Applicant: Consuelo Isabel Villarreal-Reyes, Bethlehem, PA (US)

(72) Inventor: Consuelo Isabel Villarreal-Reyes, Bethlehem, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/017,270

(22) Filed: Sep. 3, 2013

Related U.S. Application Data

(63) Continuation-in-part of application No. 12/709,305, filed on Feb. 19, 2010, now Pat. No. 8,523,573.

(51) Int. Cl.
  *G09B 19/22* (2006.01)
  *A63F 1/00* (2006.01)

(52) U.S. Cl.
  CPC .......................................... *A63F 1/00* (2013.01)

(58) Field of Classification Search
  USPC ......... 434/128, 129, 188, 191, 209, 322, 353; 273/292, 302
  See application file for complete search history.

(56) References Cited

U.S. PATENT DOCUMENTS

| | | | | |
|---|---|---|---|---|
| 1,246,152 A * | 11/1917 | Perrine | | 434/209 |
| 1,843,183 A * | 2/1932 | Thompson | | 434/345 |
| 2,562,633 A * | 7/1951 | Needham | | 273/307 |
| 2,901,839 A * | 9/1959 | Huff | | 434/207 |
| 4,173,834 A * | 11/1979 | Arzola | | 434/209 |
| 5,242,171 A * | 9/1993 | Hata | | 273/292 |
| 6,065,970 A * | 5/2000 | Elliott | | 434/209 |
| 6,109,924 A * | 8/2000 | Sanford et al. | | 434/191 |
| 6,341,779 B1 * | 1/2002 | Merritt | | 273/292 |
| 6,447,300 B1 * | 9/2002 | Greenberg | | 434/188 |
| 6,676,414 B1 * | 1/2004 | MacHendrie et al. | | 434/201 |
| 6,863,275 B2 * | 3/2005 | Chiu et al. | | 273/302 |
| 6,910,893 B2 * | 6/2005 | Dillhoff | | 434/129 |
| 7,220,126 B2 * | 5/2007 | Glymph | | 434/191 |
| 7,243,919 B2 * | 7/2007 | Ringuette | | 273/299 |
| 7,367,564 B2 * | 5/2008 | Latell | | 273/299 |
| 7,503,765 B2 * | 3/2009 | Randhawa | | 434/129 |
| 2006/0170162 A1 * | 8/2006 | Kumar | | 273/302 |
| 2007/0138745 A1 * | 6/2007 | Duncan | | 273/292 |
| 2007/0267817 A1 * | 11/2007 | Okajima | | 273/299 |
| 2008/0284102 A1 * | 11/2008 | Mizrahi | | 273/299 |

* cited by examiner

*Primary Examiner* — Kurt Fernstrom
(74) *Attorney, Agent, or Firm* — Clinton H. Wilkinson; Charles A. Wilkinson

(57) ABSTRACT

An electronic mathematical education game including a first series of cards to be dealt to a plurality of players containing the result of a mathematical operation, and another series of cards each containing a mathematical operation corresponding to a least one of the results on the first series of cards, whereby one of said series of cards is designated as the set of "answer" cards and a plurality of said answer cards are distributed to the players while the other is designated as the set of "question" cards to be asked serially by a judge, whereupon in each round the players having a correct answer to the displayed question may transfer their matching card to the judge, with the winner being the first player to turn in all of his or her cards to the judge, and whereupon during successive games the sets of question and answer cards are reversed.

6 Claims, 10 Drawing Sheets

Answer Chart = Leaf of Answer

| 1 | 2 | 3 | 4 | 5 |
|---|---|---|---|---|
| 1 X 1 = 1 | 2 X 1 = 2 | 3 X 1 = 3 | 4 X 1 = 4 | 5 X 1 = 5 |
| 1 X 2 = 2 | 2 X 2 = 4 | 3 X 2 = 6 | 4 X 2 = 8 | 5 X 2 = 10 |
| 1 X 3 = 3 | 2 X 3 = 6 | 3 X 3 = 9 | 4 X 3 = 12 | 5 X 3 = 15 |
| 1 X 4 = 4 | 2 X 4 = 8 | 3 X 4 = 12 | 4 X 4 = 16 | 5 X 4 = 20 |
| 1 X 5 = 5 | 2 X 5 = 10 | 3 X 5 = 15 | 4 X 5 = 20 | 5 X 5 = 25 |
| 1 X 6 = 6 | 2 X 6 = 12 | 3 X 6 = 18 | 4 X 6 = 24 | 5 X 6 = 30 |
| 1 X 7 = 7 | 2 X 7 = 14 | 3 X 7 = 21 | 4 X 7 = 28 | 5 X 7 = 35 |
| 1 X 8 = 8 | 2 X 8 = 16 | 3 X 8 = 24 | 4 X 8 = 32 | 5 X 8 = 40 |
| 1 X 9 = 9 | 2 X 9 = 18 | 3 X 9 = 27 | 4 X 9 = 36 | 5 X 9 = 45 |
| 1 X 10 = 10 | 2 X 10 = 20 | 3 X 10 = 30 | 4 X 10 = 40 | 5 X 10 = 50 |

| 6 | 7 | 8 | 9 | 10 |
|---|---|---|---|---|
| 6 X 1 = 6 | 7 X 1 = 7 | 8 X 1 = 8 | 9 X 1 = 9 | 10 X 1 = 10 |
| 6 X 2 = 12 | 7 X 2 = 14 | 8 X 2 = 16 | 9 X 2 = 18 | 10 X 2 = 20 |
| 6 X 3 = 18 | 7 X 3 = 21 | 8 X 3 = 24 | 9 X 3 = 27 | 10 X 3 = 30 |
| 6 X 4 = 24 | 7 X 4 = 28 | 8 X 4 = 32 | 9 X 4 = 36 | 10 X 4 = 40 |
| 6 X 5 = 30 | 7 X 5 = 35 | 8 X 5 = 40 | 9 X 5 = 45 | 10 X 5 = 50 |
| 6 X 6 = 36 | 7 X 6 = 42 | 8 X 6 = 48 | 9 X 6 = 54 | 10 X 6 = 60 |
| 6 X 7 = 42 | 7 X 7 = 49 | 8 X 7 = 56 | 9 X 7 = 63 | 10 X 7 = 70 |
| 6 X 8 = 48 | 7 X 8 = 56 | 8 X 8 = 64 | 9 X 8 = 72 | 10 X 8 = 80 |
| 6 X 9 = 54 | 7 X 9 = 63 | 8 X 9 = 72 | 9 X 9 = 81 | 10 X 9 = 90 |
| 6 X 10 = 60 | 7 X 10 = 70 | 8 X 10 = 80 | 9 X 10 = 90 | 10 X 10 = 100 |

Fig. 5

Table of Occurrences
CARDS OF RESULTS

72 — 74

| | | | | | |
|---|---|---|---|---|---|
| 1 - 1 | 12 - 4 | 21 – 2 | 32 – 2 | 42 – 2 | |
| 2 – 2 | 14 – 2 | 24 – 4 | 35 – 2 | 45 – 2 | |
| 3 – 2 | 15 – 2 | 25 – 1 | 36 – 3 | 48 – 3 | 70 |
| 4 – 3 | 16 – 3 | 27 – 2 | 40 – 4 | 49 – 1 | |
| 5 – 2 | 18 – 4 | 28 – 2 | | 50 – 2 | |
| 6 – 4 | 20 – 4 | 30 – 4 | | | |
| 7 – 2 | | | | | |
| 8 – 4 | | | | | |
| 9 – 3 | | | | | |
| 10 - 4 | | | | | |

| | | | | |
|---|---|---|---|---|
| 54 – 2 | 63 – 2 | 72 – 2 | 81 – 1 | 100 – 1 |
| 56 – 2 | 64 – 1 | 80 – 2 | 90 - 2 | |
| 60 – 2 | 70 - 2 | | | |

CARDS OF RESULTS
50%

72 — 74

78

| | | | | |
|---|---|---|---|---|
| 1 - 1 | 12 - 3 | 21 – 1 | 32 – 1 | 45 – 1 |
| 2 – 2 | 14 – 1 | 24 – 2 | 35 – 1 | 50 – 1 |
| 3 – 2 | 15 – 2 | 25 – 1 | 36 – 1 | |
| 4 – 3 | 16 – 2 | 27 – 1 | 40 – 2 | |
| 5 – 2 | 18 – 2 | 28 – 1 | | |
| 6 – 3 | 20 – 3 | 30 – 2 | | |
| 7 – 1 | | | | |
| 8 – 3 | | | | |
| 9 – 2 | | | | |
| 10 - 3 | | | | |

Fig. 6

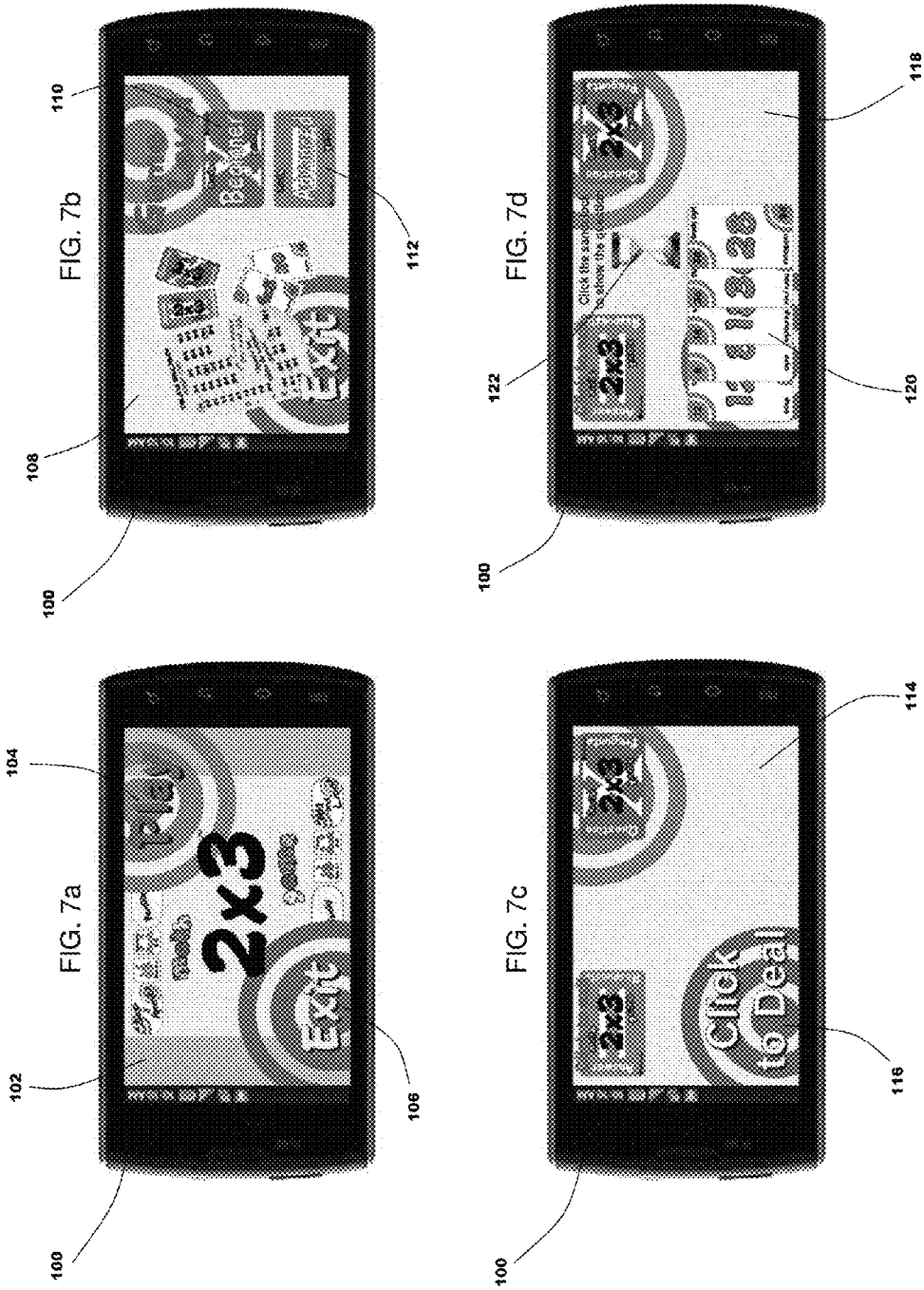

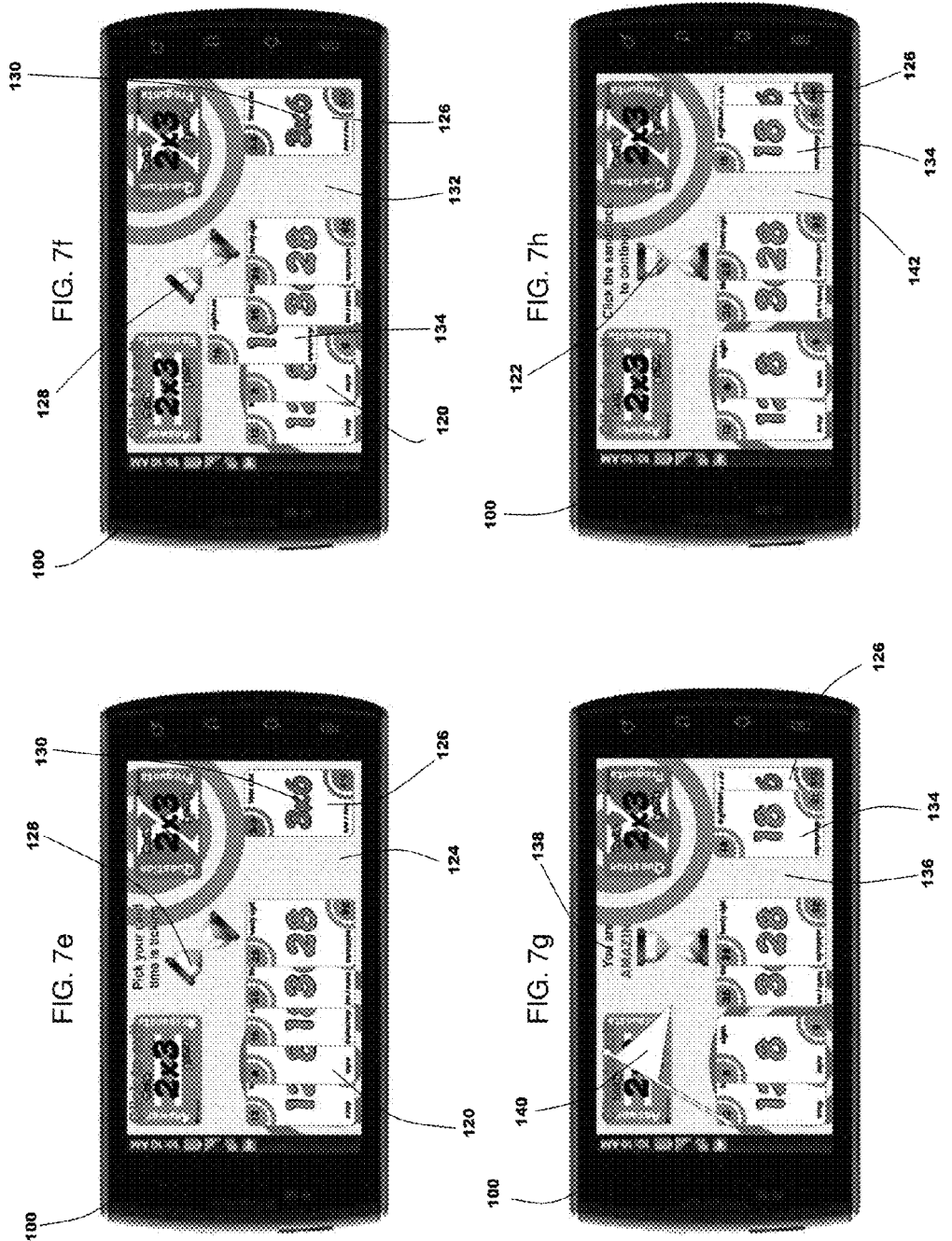

"2×3" MATH LEARNING GAME

BACKGROUND OF THE INVENTION

1. Field of the Invention

The present invention relates generally to card games as well as teaching and learning aids and tools, and more particularly to a mathematical operation learning and practice card game that it interesting and entertaining to both children and adults.

2. Preliminary Discussion and Discussion of Prior Art

A wide variety of resources and materials are available for teaching foundation or basic skills such as reading, writing, arithmetic, and the like, particularly for use by children and young students. Rather than taking the form of drills or lessons, which are likely to become tiresome and therefore after a short time will be objected to by a child, some of these resources and materials are provided in the form of a game or other activity that is not only entertaining but also teaches the particular lesson involved. Examples of games having an educational and teaching theme include card games, board games, video games, and other game scenarios and activities. The following references are exemplary of these efforts, particularly with respect to mathematical teaching games including cards.

U.S. Pat. No. 5,242,171 issued to H. Hata on Sep. 7, 1993, entitled "Game Cards for Playing a Game and for Learning Arithmetic", discloses an arithmetic teaching game wherein in a basic embodiment a set of forty-five game cards of two different card types is provided. The first type comprises 18 cards having one of the numbers 1 to 9 each indicated on two of such cards, and the second type comprises 27 cards having one of the numbers 10 to 81 thereon, which numbers are the answers to the multiplication table from 1×1 to 9×9. The cards also have printed thereon the divisors or prime numbers of such number, and pictorial designations may be provided on cards with numbers that are multiples of 2, 3, 5, and/or 7 to aid young children in understanding the cards. Various games using such cards are proposed. In one game, the cards with 1 to 9 are placed in a pile and the cards with 10 to 81 are dealt to the players. The dealer exposes two cards, and any player can discard a card bearing the answer to the number if the two cards are multiplied. Then one of the exposed cards is discarded, and another is selected. The players can then discard a card bearing the multiplication answer if the numbers on the two new cards are multiplied, and so on, with the winner being the first player to discard all of his/her cards. This game lacks the speed or competitive feature of the present Applicant's game, wherein in each round only the player who is the first to recognize the answer to a mathematical operation problem and who has the correct answer in his or her set of cards can discard such card.

U.S. Pat. No. 6,341,779 issued to A. Merritt on Jan. 29, 2002, entitled "Mathematical Card and Dice Game", discloses a combination dice and card game wherein a deck of cards is divided into four suits of fifteen cards each, ten being numbered 1-10 and five having one of the letters "Z", "E", "T", "R", and "E" thereon, with numerical values such as 11 through 15 being assigned to such non-numeric cards. In one game, for each player's turn, the timer is set, and the player rolls three dice. Then, he or she tries to form valid mathematical relationships based on the values of the dice, using all three dice at least once and any mathematical operations, and any cards in a player's hand having the correct answer to one of such mathematical relationships may be removed from the player's hand. For example, if the values 2, 3, and 4 are rolled, a valid relationship would be (2×3)+4=10, so if a player has a "ten" this card can be discarded. If a card is incorrectly discarded, then the incorrect card as well as a penalty card is given to the player. Similarly, if a player cannot discard a card, a penalty card is given.

U.S. Pat. No. 6,863,275 issued to Chiu et al. on Mar. 8, 2005, entitled "Matching Card Game and Method for Playing the Same", discloses a card game wherein letters or numbers as well as a color bar are placed on individual playing cards. The cards are dealt to the players, and a visual indicia on the cards is selected to indicate a match between selected cards, whereby the matching cards may be discarded. The player who discards all of his or her cards first is declared the winner. Such game is designed to teach young children to recognize basic elements such as individual letters, numbers or colors, not more complex associations such as mathematical operations.

U.S. Pat. No. 7,220,126 issued to R. C. Glymph on May 22, 2007, entitled "Educational Mathematics Game", discloses a math game designed to teach basic concepts involving integers, wherein the game includes a die having different math operations and instructions on its faces, a first set of "players" cards having a subset of cards numbered 1-10, and a second set of ten "blue" cards numbered 1-10. To play, each player is dealt nine "players" cards, and the "blue" cards are placed face up on a table. Then, the first player rolls the die and a math function or other instruction is indicated. Where a math function is indicated, the player must take a card from his or her hand and place it face up, and a math problem resulting from the combination of the "players" card, the "blue" card, and the math function is created. The next player in rotation must then lay down two cards that add up to the answer to such problem, or if he or she cannot a penalty card is awarded to such player. Play continues until one of the players is out of cards, which player is then considered the winner.

U.S. Pat. No. 7,243,919 issued to B. Ringuette on Jul. 17, 2007, entitled "Card Game", discloses a method of playing a multiplication and division card game, wherein a deck of cards each having a numerical value on one face is provided. Each player is dealt a set of the cards, and the remaining cards are placed in a discard pile with the top card face up. The first designated player then selects a play card from his or her hand having a numerical value that is a multiple or divisor of the card face up on the discard pile, which card is similarly then placed face up on top of the discard pile. A draw pile is also provided from which a player must draw a card if he or she does not have a card that is a multiple or divisor of the face up card. Such game steps are repeated by the players until one player has no cards left, which player is then declared the winner.

U.S. Patent Application Publication 2006/0170162 to A. Kumar published Aug. 3, 2006, entitled "Ten0", discloses a math card game comprised of a deck of 80 operand cards and 12 special cards. Each player is dealt five cards, and following the operands on the cards the players must add, subtract, multiply and divide with the result staying within a 0 to 100 point range.

U.S. Patent Application Publication 2007/0138745 to E. A. Duncan published Jun. 21, 2007, entitled "Educational Card Game and Related Methods of Use Therefor", discloses a math card game comprised of a deck of cards divided into four categories of primary cards having an equal number of cards, and a fifth secondary category having a lesser number of cards. The primary cards each have a numerical value thereon, and the secondary cards are considered "wild cards". The cards are shuffled and distributed to the players, and then to start play each player turns over one of their cards simultaneously. A mathematical rule is then applied to the numerical values revealed, and the person giving the correct result the fastest wins the round, collecting the other player's card in such round. Two wild cards are also included, which are automatically winners. Such game is an accumulation style card game, rather than a shedding style card game, although the first person with the correct answer in each round is considered the winner of such round. Various other card games using such game cards are also proposed.

U.S. Patent Application Publication 2007/0267817 to Y. Okajima published Nov. 22, 2007, entitled "Game Tool and Game Method", discloses a mathematical game wherein a plurality of cards having numerical values or a mathematical operator on one face and an "equals" sign on the opposite face are divided into groups, and the players must create math equations using cards of the same group. A standard or rank is applied to the created equations, and the players are ranked based on such standard or rank.

U.S. Patent Application Publication 2008/0284102 to S. Mizrahi published Nov. 20, 2008, entitled "Numerical Card Games", discloses several different card game playing methods wherein generally an arithmetic correlation between two cards is defined. A deck of cards containing numbers such as 1-100, as well as several "wild cards", is provided. The cards may also contain markings to identify the type of number on the card, such as whether the number is a square number or prime number, as well as other markings or symbols. In general, participants attempt to discard their hand of cards in response to arithmetic correlations. In one game, each player is dealt seven cards, and a draw pile and discard pile are provided, with the top card on the discard pile being face up. During play the players can in turn discard one card from their hand if such card has at least one digit in common with the face up card on top of the discard pile, or a single digit card may be discarded upon any other single digit card. If no card is discarded, such player is given another card as a penalty. Various slightly alternative games or game rules are also disclosed.

Despite such known games, there remains a continued desire for new, different, and exciting educational games that are easy to play and interesting and entertaining. The present inventor has conceived of such a new and entertaining card game that is particularly fast moving and significantly aids in the learning of quick basic mathematical calculations, and can be played by both children and adults as well as more mature persons including mixed groups.

OBJECTS OF THE INVENTION

An object of the present invention is to provide a mathematical operation practice and learning card game that facilitates both learning and remembering mathematical operations and combines both one's skill and knowledge with chance.

It is a still further object of the invention to provide a mathematical operation learning and practice game that is easy to play and learn, and which is interesting and entertaining to both children and adults of all ages.

It is a still further object of the invention to provide a mathematical operation learning game that encourages learning basic mathematical operations and tables and is both fun and challenging.

It is a still further object of the invention to provide a learning game that is not only interesting and competitive, but holds the players' interest for significant periods.

It is a still further object of the invention to provide a card-type game that will significantly improve the command by persons and family members of all ages, but particularly of young persons, of mathematical operations.

It is a still further object of the invention to provide a card-type game that is particularly fast paced and maintains competitive interest of both children and adults.

It is a still further object of the invention to provide a competitive game that can be beneficial to and facilitate quick recall and use of basic mathematical operations.

It is a still further object of the invention to provide a competitive mathematics game that can be played "forward" and "backward" and thereby further increase the mathematical skills of the players.

It is a still further object of the invention to provide a competitive mathematics game, which is valuable to learning mathematics functions by both adults as well as less mature persons.

Still other objects and advantages of the invention will become clear upon review of the following detailed description in conjunction with the appended drawings.

SUMMARY OF THE INVENTION

A fast-paced card game designed to teach basic mathematical operations such as addition, subtraction, multiplication and division is provided, which game is educational and entertaining to children, young students, and adults. The game can be played by between three and eleven players. One person is designated the judge, and is given an answer chart containing the correct answers to all of the mathematical equation and operation questions in the game. In one embodiment, two separate decks of one hundred cards are provided. Each of the cards in the first deck has on one face a mathematical operation but not the correct numerical result of such operation, and each of the cards in the second deck has on one face the correct numerical result to a mathematical operation on at least one of the cards in the first deck. For example, the number "18" on one of the cards in the second deck is the correct result to the mathematical operation $2 \times 9/6 \times 3/2 \times 9/3 \times 6$ on one of the cards in the first deck.

Each player is dealt a hand of between 8-15 cards, depending upon the number of players. Then, the designated judge will start a timer and turn over or reveal either a math operation "question" from the first deck, or a math operation result "question" from the second deck, depending upon which mode of play is selected. The judge will also preferably repeat the question verbally. After hearing or viewing the "question", each player will then as quickly as possible review their hand of "answer" cards to see if one of these cards contains the correct "answer" to the math "question" being asked. Any player having a card containing the correct "answer" will then as quickly as possible hand or otherwise reveal the card to the judge, attempting to be the first player to reveal such answer. If two or more players have the correct answer, the player who reveals the answer first wins the round, and this player's "answer" card is placed on the discard pile, while "answer" cards revealed later by other players are returned to those players or taken back by those players. If the first player to reveal a card to the judge gives an incorrect "answer", the other players will have an opportunity to answer the question correctly, until the timer runs out, typically in about ten to fifteen seconds per round. Any player or players giving an incorrect answer must take their card back, and in addition, as a penalty at least two additional "answer" cards are added to their hand or deck of cards. The first player to dispose of or get rid of all of their assigned "answer" cards is declared the "Winner". As a variation of the game, the first and second decks are alternatingly designated as the "question" or "answer" cards in consecutive games, which provides a significant amount of mathematical equation learning and practice both in recognizing math operations and equation results. In other embodiments, the game may be provided in an electronic versions such as may be played on a computer or mobile device in accordance with a computer program operable to provide the mathematical equation learning and practice game environment and player options.

BRIEF DESCRIPTION OF THE APPENDED DRAWING

FIG. 1 diagrammatically illustrates one moment of play of the card game of the present invention being played by six players monitored or led by one judge.

FIG. 5 illustrates in expanded form one embodiment of an answer chart available for use by the appointed "judge" of the game of the present invention.

FIG. 6 illustrates a "table of results" corresponding to a preferred embodiment of the game of the present invention.

DETAILED DESCRIPTION OF THE PREFERRED EMBODIMENTS

Figure 1:
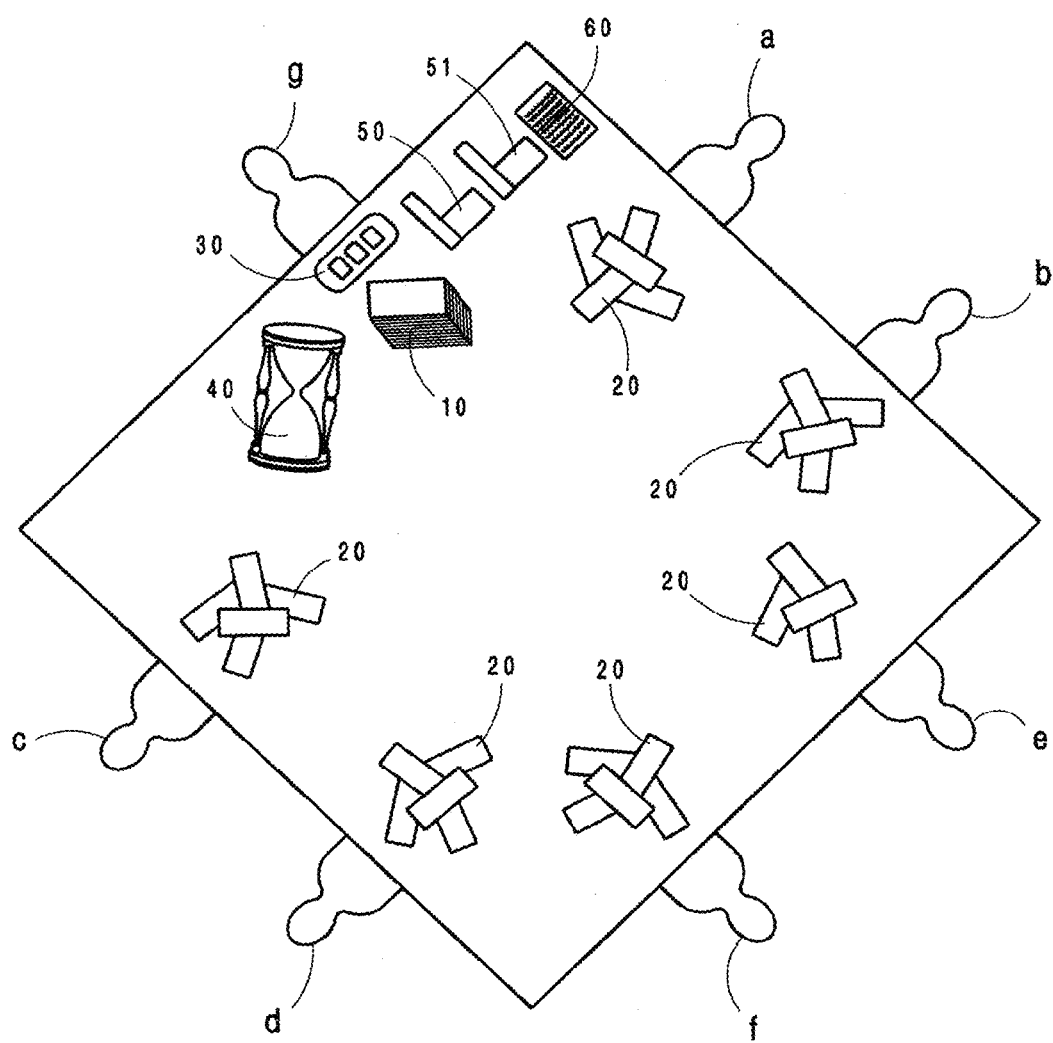

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

As used herein, "mathematical equation" or "function" refers to a full or completed arithmetic expression such as (5×4=20). In addition, as used herein "mathematical operation" refers to a portion of a mathematical equation or function such as (5×4), wherein the numerals "5" and "4" are operands or input quantities for the operation, and "x" is the operator for such operation, which in present example is the symbol for the multiplication operator to be performed on the operands. In addition, "result of a mathematical operation", "result of an operation", and where appropriate "result" refers herein to the figure that follows the "equals" sign in a mathematical equation or function and is the correct numerical outcome of the mathematical operation. In addition, as used herein "operand" refers to one of the inputs of a mathematical operation or equation, such as "5" and "4" in the above example.

Young children in school have been drilled in mathematical functions and problems for as long as formal schools have existed so that such children learn to calculate the answers to problems in a functional and efficient manner, for use particularly in commerce and as consumers later in their lives. Those who have not mastered basic mathematical functions such as addition, subtraction, multiplication and division find themselves at a significant competitive disadvantage when dealing with others of our society. Several recent developments have tended to slow down the mastering of mathematical equations or functions and cause difficulty when dealing with others. One such development has been the widespread use of electronic calculators and microcomputers, which are now used more and more frequently by younger and younger persons. By the use of such computing device, all the user has to do is to punch in the basic numerals or operands and the operator sign and the answer will automatically appear. The procedure is quick, simple and satisfactory to calculation aficionados. However, there are times when a computing machine is not available and one wishes to do at least rough calculations, so to speak, "in one's head". For example, in tests in school, in calculating prices and discounts at a store check-out counter (when many persons are hesitant to use a computer that appears to be double-checking the check-out register personnel), and last, but not least, when one suspects that their computer device is "acting up", which feeling many persons are subject to quite frequently. At all such times as well as other times when the person involved is brought to a "stand still" if they cannot recall basic mathematical functions, the individual involved experiences one of the more frustrating occurrences to which the modern so-called "man in the street" may be subject to. Yet, in order for math functions to come instantly and automatically to one's mind when needed, they must be practiced periodically to keep the required neural pathways quickly and hopefully essentially instantly available for use when necessary.

A second development in recent years is the increasing number of new arrivals to American shores. Such arrivals, if they have already learned their basic mathematical functions, are likely to have little difficulty, even though the names for such functions as well as the numbers may be different. However, for those over the age of about six years, when one's faculty of picking up new speech patterns begins to decline, the difficulty of picking up new speech or language, plus memorizing mathematical functions declines to the point where bringing such functions easily into memory when needed may take considerable additional practice and the game of the present invention has been found to be particularly effective in this regard.

A further development in American schools is that the increasing amount of knowledge which it is thought desirable for children to learn as well as the background thought that "microcomputers are always available" has tended to decrease the time allotted for the practice and learning of basic mathematical operations and functions such as the multiplication tables and the like. While many young persons learn these operations and functions quite thoroughly, a substantial portion do not and it is these that the present invention is intended to aid plus providing an enjoyable fast paced game for the entertainment of others, including entire families and adults, who frequently like to participate either as judges or players. While the game of the invention therefore may not be for the mathematical "wizard", most persons will find it both interesting and useful in a social setting, particularly where at least some school-age persons take part in the game.

The basic principle of the game of the invention in a preferred embodiment is that a plurality of players are provided with, or dealt, a series of "answer" cards having on one face either a result of a mathematical operation in a first mode of play, or a mathematical operation in a second mode of play. In addition, a "judge", who may be appointed in any suitable manner, such as by general agreement, acknowledgement, voting or request by the players and the like, is provided with a series of "question" cards containing either a mathematical operation on one side in said first mode of play, or a result of a mathematical operation on one side in said second mode of play, wherein the mathematical operation result cards contain the correct result or answer to at least one of the mathematical operations on such other set or deck of cards. Each of the "question" and "answer" cards also preferably has printed or otherwise displayed on the side opposite the multiplication operation or result designations decorative material such as a mathematical decoration or other decoration. The two sides of either set or deck of cards should not be complementary in the sense that one side shows the operand or mathematical operation or function involved and the other side the answer, since the dealt cards will be examined by the players. During play, the judge will pick up a "question" card from the collection of such cards and display it to the players, who presumably having already gone through, or sorted through their hand of "answer" cards, which have been dealt out to them, will be at least somewhat familiar with what they have in their collection of dealt out cards and will as quickly as possible extract the card which sets forth the correct answer and display such card to, and preferably hand it to, the judge or place it in a designated area. The judge will initially accept for further review for correctness the first card presented to him or her from one of the players that states the answer to the original problem that matches, or is the answer, to the problem, which the judge has displayed. It thus should be evident that the players may be provided in any one game played with a hand of "answer" cards consisting either of a plurality of cards from the set of mathematical operation cards, or a plurality of cards from the deck of mathematical operation result cards, and the judge will in each have and serially display the matching "question" cards.

Speed is essential in turning in or handing the judge a player's card setting forth the correct answer, since other players may also have cards that state a correct answer to the operation or problem that results in the function which the judge has displayed. For example, where the set of cards including a mathematical operation result are used as the "question" cards, an answer of 24 can result from the operation of 6×4, 3×8, 2×12, or even 4×6 and the like plus the reverse of each of the uneven enumerative functions. Since the aim of the educational game, or the way such game may be won, is to be the first to turn in or dispose of all the cards that have been dealt to one, and a player may do so simply by disposing of a series of cards in his or her card pile of dealt cards before any other player disposes of their cards, it is beneficial to dispose of one's cards at every chance one has before someone else uses the opportunity to dispose of their cards displaying the same answers or answers to different problems having the same answer. In other words, there may be various combinations of multiplicands or the like which provide the answer to the number displayed by the judge, and since the object of the game is to dispose of or divest oneself from one's supply of cards as soon as possible before another player answers and divests him or herself of similar pertinent cards, the players are driven to provide answers as fast as possible, thereby training the players for quick recall of the answers to various multiplication functions. As mentioned above, it is also possible in playing the game of the invention to initially deal out the mathematical operation cards stating the problem to the various players as "question" cards and have the judge display the answer to the matching problem of the operation. While this is somewhat easier, it is also valuable particularly with those less certain of the relationships involved such as younger children.

It will be noted that in a basic form of the game, the disposal of cards is based upon matching mathematical operations displayed by the judge with answers or results of said operations held by the players and, therefore, is the reverse of the usual memorization of math tables. This both makes the game more difficult and also gives the players more practice in repeating the particular mathematical operations and fixes the mathematical relationship more securely in the minds of the players, similar to the fact that learning to go backwards through the alphabet from each letter to the previous letter more securely fixes the normal forward order of the alphabet more firmly in mind. Playing the game of the invention both ways consecutively and very effectively fixes both the operations and the results in the minds of the players.

The card game of the present invention has, as will be evident from the above, been designed to teach basic math skills to those who do not possess such skills in a simple manner and in a competitive and fun environment, as well as to improve the memorization and recall skills of the players of basic math operations such as addition, subtraction, multiplication, and division. The card game comprises a unique combination of skill as well as luck or chance and tests one's knowledge and speed of recall of such basic math operations, whereby the chance feature serves as a moderator so that less skilled players will not be intimidated and will have a significant opportunity to be declared the winner of the game. Typically, those learning basic math operations such as addition, subtraction, multiplication, and division will be required to memorize basic tables, such as the multiplication or times tables from "1×1" to "10×10" or "12×12" or the like. Unfortunately, only a few students are successful in simply studying and memorizing the tables, and therefore will usually learn through completing lessons in a workbook or the like that requires the students to repeatedly consult the tables and determine the correct answer to a question. Such lessons are generally not particularly enjoyable and therefore are not completed properly or not completed at all by some students. Such drills are, furthermore, not practical under time constraints and thus do not develop the rapidity of establishing an answer which is necessary in a fast moving world. Furthermore, older students who are not used to studying or learning may object to traditional schooling techniques. The present inventor's card and learning game therefore fulfills the need for a compelling and entertaining device or system whereby players of all ages can either learn for the first time or alternatively reinforce their knowledge of basic math operations without or outside of the traditional school atmosphere. The competitive features of the game aid in sharpening the mathematical skills and speed of computing of the players whether they are tyros or even experienced mathematicians. The game requires a judge who controls the game, and the game is so constructed that the judge also practices his or her mathematical functions as well as other skills.

FIG. 1 illustrates diagrammatically one moment in the play of the game of the invention when played by six players designated as players (a), (b), (c), (d), (e), and (f), and one judge (g) or operator of the game of the invention, all of whom are positioned around table (t). Each of the players (a), (b), (c), (d), (e) and (f) is dealt a plurality of cards from one of two sets or decks of cards, wherein depending upon the mode of play either set can be designated as the set of "question" cards or the set of "answer" cards. One set or deck of such cards is comprised of a plurality of mathematical operation cards, having on one surface two or more operands and at least one operator forming a mathematical operation, such as (6×8) or (8×6), also referred to herein as "operation" cards, while the other set or deck of such cards includes on one surface the result of at least one mathematical operation, such as (48), also referred to herein as "result" cards. For purposes of illustration, in FIG. 1 judge (g) has dealt a number of result cards 20 to each player (a)-(f) from the shuffled set or deck of result cards. In addition, the shuffled set of operation cards 10 contains on one surface one or more math operations arranged in a deck and placed face down on table (t) near judge (g). Judge (g) is also preferably given, as shown in FIG. 1 resting on table (t) near the judge's position, a chart or table 30 containing all of the correctly completed mathematical equations comprising the mathematical operations and the results of such operations on each of the individual operation and result cards 10 and 20, a timing device such as hourglass 40, a red flag 50, a white flag 51, and an instruction sheet 60. See also FIG. 4. As will be explained in greater detail below, the method of play of the present invention includes alternative game setups where a plurality of result cards 20 are distributed to players (a) to (f), while the operation cards 10 are arranged in a deck by judge (g), and in another preferred method of play operation and result cards 10 and 20 are alternatively distributed to the players in consecutive games.

Figure 2A:
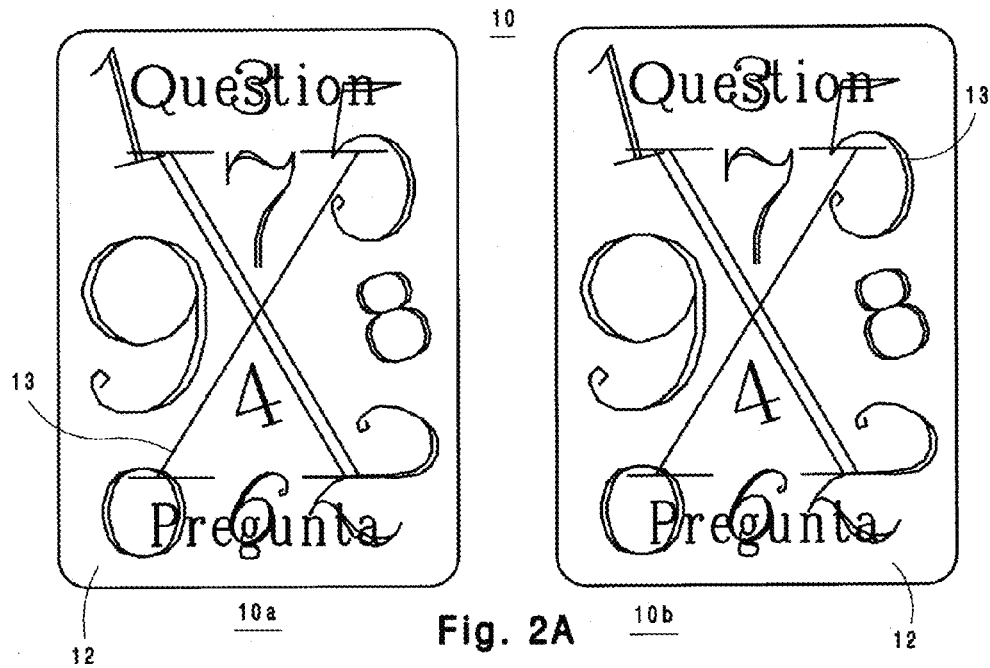
FIGS. 2a and 2b illustrate representative front and back surfaces of two cards taken from the deck of mathematical operand or operation cards of the present invention.
Figure 2B:
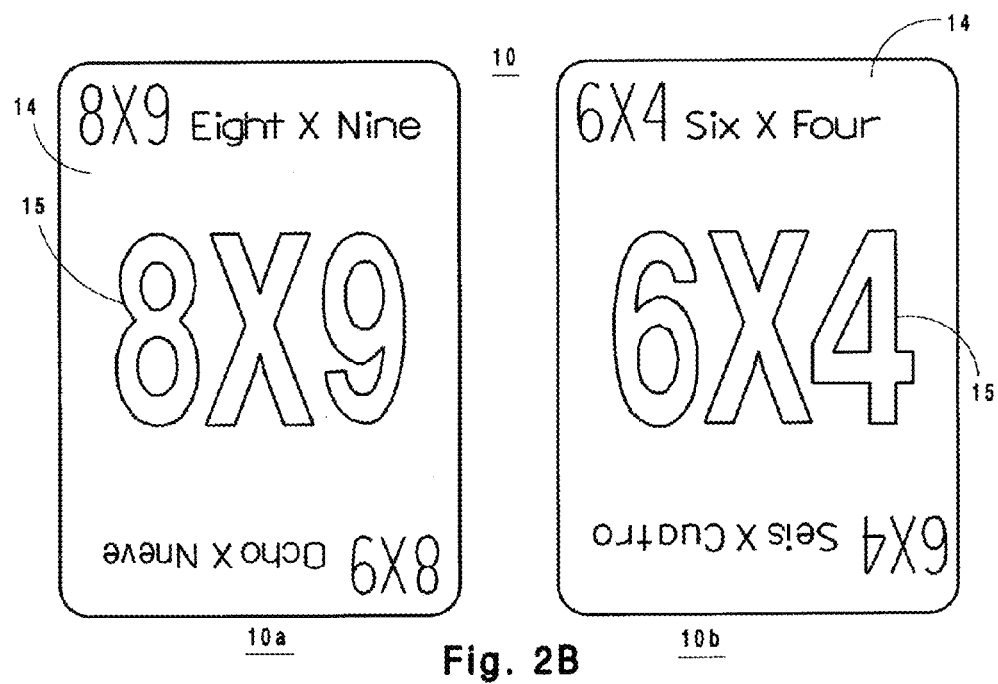

FIGS. 2a and 2b illustrate representative front and rear surfaces, respectively, of two cards from the set or deck of operation cards 10 in accordance with the present invention. The front surface 12 of each of the two representative operation cards 10 in FIGS. 2a and 2b, designated as 10a and 10b, may set forth words, numbers, letters, designs, decorations and other indicia that are appropriate. By way of example, provided on front surface 12 of operation cards 10a and 10b is the word "Question" in both English and Spanish, as well as a large "X" 13 which is indicative that the question or mathematical operation on the card includes the "times" or "multiplication" operator and thus is a multiplication question. The rear surface 14 of operation cards 10a and 10b shown in FIG. 2b also includes any appropriate words, numbers, letters, decorative materials, designs, and other indicia as desired, and in addition includes at least one mathematical operation 15. By way of example, in FIG. 2b rear surface 14 of card 10a has the multiplication operation (8×9) thereon, and card 10b has the multiplication operation (6×4) thereon, preferably centered and provided in a large font. In addition, the respective mathematics operation is spelled out in both English and Spanish on rear surface 14 of cards 10a and 10b, and the operation is also repeated in a smaller font along the top and bottom edges of the card. As will be understood, the particular contents and other decorative features on the front and rear faces 12 and 14 of operation cards 10 may vary significantly depending upon the desired design plus the operator functions which the card expresses. For example, if the mathematical operation on card 10 included the addition operator instead of the multiplication operator, a large "+" sign would replace the "X" on the front surface 12 of the card.

Figure 3A:
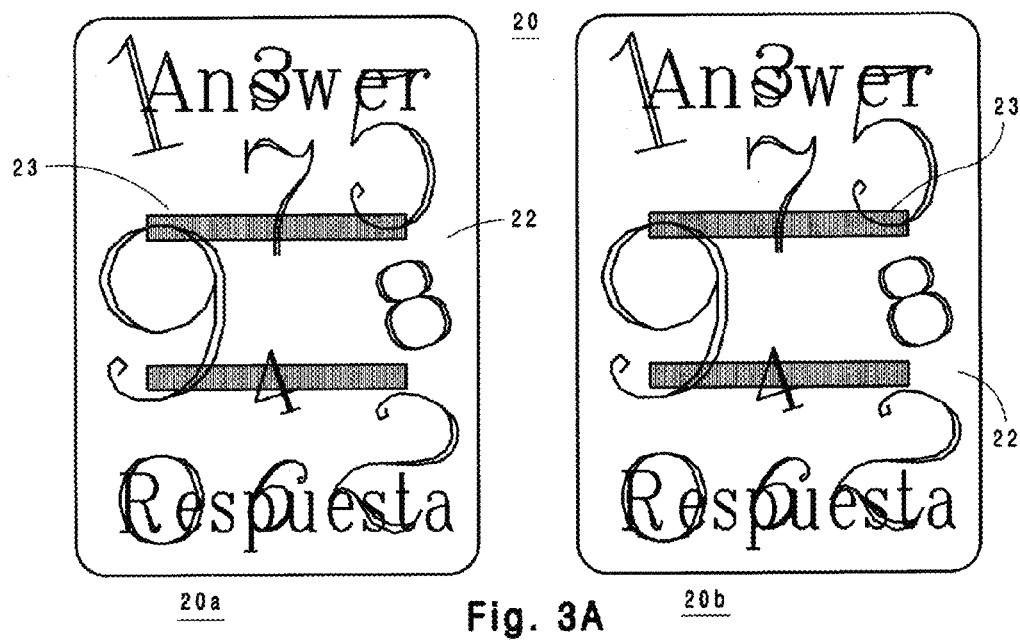
FIGS. 3a and 3b illustrate representative front and back surfaces of two cards taken from the deck of mathematical operation result cards of the present invention.
Figure 3B:
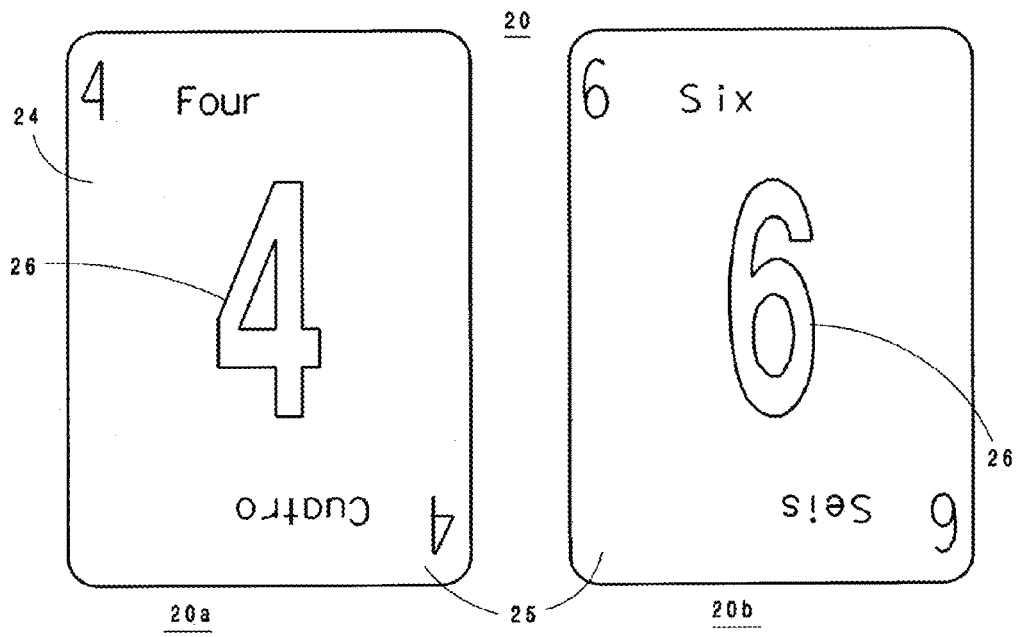

FIGS. 3a and 3b illustrate representative front and rear surfaces, respectively, of two cards from the set or deck of result card 20, in accordance with the present invention. The front surface 22 of each of the representative result cards 20 in FIGS. 3a and 3b may contain words, numbers, letters, designs, decorations and other indicia that are deemed appropriate. By way of example, front surface 22 has the word "Answer" in both English and Spanish printed along the upper and lower edges, and a large "equals" (=) sign or operator 23 centered on the card, which is indicative that the card is a result card and includes the "answer" or correct result to a mathematical operation on at least one of the operation cards 10. The rear surface 24 of the result cards 20 may also contain words, numbers, letters, designs, and other indicia, including at least one answer or result 26 to a mathematical operation on at least one of the operation cards 10. By way of example, in FIG. 3b one of the result cards 20a has the answer or result "4" thereon, and the other 20b has the answer or result "6" thereon, which numerals are preferably centered on rear surface 24 and in a large font. In addition, each card contains the respective numerical result spelled out in both English and Spanish, and the result is also repeated in a smaller font along the top and bottom edges of the card. Although the mathematical operations 15 and results 26 on cards 10 and 20 are illustrated both English and Spanish, it will be understood that such indicia can be in a single language, a language other than English or Spanish, or in several different languages, such as French, German, Chinese, etc. Additionally, it will be understood that indicia other than numbers and letters can be used to indicate a number, letter, operation, result, or to convey any other information to the players. Furthermore, although cards 10 and 20 of the game of the present invention are illustrated in the Figures with respect to learning multiplication, it will also should be readily evident to those skilled in the art that the present game may be used to learn other mathematical function, such as addition, subtraction, and division, or any combination of two or more of such functions.

It is preferable to the point of almost requirement that the result cards 20 contain or display only a single answer or result to a mathematical operation, since such result should be displayed or brought forth during the game or in play essentially in a random manner so that the players will be forced if they are to act quickly in presenting their matching operation card 10 to the judge to previously calculate the result to the operation shown and then to pick out such card quickly and present to the judge before another player presents an operation card 10 having the same answer. This provides incentive for the player to keep in mind and therefore reinforce his or her memory of the answer or result in order to react quickly in handing in his or her operation cards 10 as quickly and appropriately as possible. In essence, each player will try to visualize the answers or results to each of the operations in his or her already dealt operation cards 10 and will thereby be forced to at least partially memorize them with the result and the operation together or closely associated in memory. This is not easy, and so in everyday life tends to be avoided, but in the stress of a competitive situation in a game the effort will almost always be made, particularly if the sequence of results presented by the judge is random, as is required by the selection of results to which the operation is to be matched which are random from a shuffled deck of result cards, or otherwise randomly answered cards are used. It will usually be advantageous for the judge to have available not only randomly arranged or shuffled operation cards, but also answer chart 30 (see FIG. 5) containing a list of completed mathematical equations 32 arranged in numerical order, with the various possible mathematical operations associated with each result being provided for the judges to corroborate his or her ruling as to whether any given operation will provide the result in question, or vice versa.

Normally the judge will also have to be quick in calculating the answers from the cards also, so that the judge also is given considerable practice in providing answers to the operations or operations to match the results, all practice which particularly the younger segments of society are sadly lacking in the present microcomputer age.

It is also quite important that a limited period be given for the players to attempt to supply a mathematical operation or result card for any given answer. Otherwise, the less proficient player will tend to try to figure out a reasonable operation or result for a given answer rather than committing each operation and its result to memory. A stopwatch with an alarm is therefore of critical importance if the game is to significantly increase the mathematical facility of the players.

As will be evident to the more mathematically sophisticated, the mathematical operations on set of cards 10 and the corresponding results of the operations on matched set of cards 20 can be referred to as corollary functions since they are technically the same and therefore matched together. In other words, the mathematical equation 10×10=100 sets forth two corollary functions which are exactly equal or represent an equality.

When the game is played in a manner in which the players are dealt a plurality of result cards 20, and the operation cards 10 are serially presented or displayed by the judge and the players compete to present a result card 20 with the correct answer to the judge, the players will also usually try to come up in their minds preliminarily with the problems or operations which could result in the answers on their cards. This "preliminary figuring" also provides a significant amount of practice in solving the operations and serves to effectively fix the mathematical functions or equations in the players' minds.

Referring now to FIG. 5, as mentioned briefly above there is shown a representative answer chart 30 in accordance with the present invention. Answer chart 30 includes all the individual mathematical operations on the operation cards 10, as well as all of the corresponding result to such mathematical operations on result cards 20, although it is not necessary that there be a "question" card for each of the answers on answer chart 30. By way of example, chart 30 in FIG. 5 has thereon the results to the multiplication tables for the integers 1-10, i.e. from "1×1" to "10×10". Such results may be arranged on answer chart 30 individually as sets 32 of mathematical equations 34 in FIG. 5, or may be provided together in a single table, or in any other suitable format. In other embodiments, the answer chart may contain a greater or lesser number of equations, depending upon the number or combination of types of questions. Other indicia, which may be either informational or decorative, may also be provided on the surfaces of the answer chart. By way of example, answer chart 30 contains the heading "Answer Chart" 34 in both English and Spanish, as well as an "equals" sign (=), which is also indicative of the card's purpose.

Figure 4:
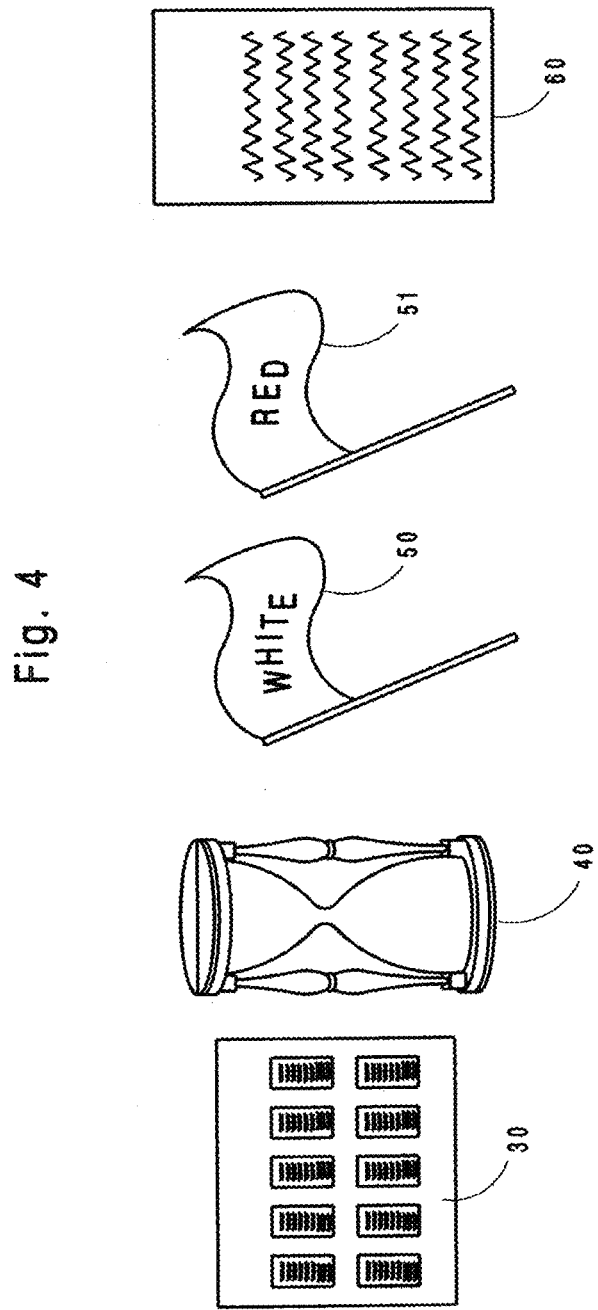
FIG. 4 illustrates other materials and parts including with the game of the invention that a "judge" preferably has available as shown in FIG. 1 in one embodiment of the "game" of the present invention to aid in expeditiously regulating play of the game.

FIG. 4 illustrates several of the other materials and/or game parts that are included or used with the learning game of the present invention in addition to sets of operation and result cards 10 and 20. Illustrated in FIG. 4 are answer chart 30 (already discussed above with reference to FIG. 5), timing device 40, flags 50 and 51 and instruction sheet 60. Timing device 40 may be an hourglass or sand timer style timer such as shown in FIGS. 1 and 4, or alternatively may be another suitable type of timing device such as a mechanical or digital clock, stopwatch or the like. Flags 50 and 51 are provided for use during game play to indicate visually to the players when a correct or wrong answer to one of the questions is given by one of the players, and typically will be used in addition to a verbal or other indication. Red flag 51, for example, can be waved very quickly when an incorrect response is given indicating to the other players that an incorrect response has been given and any player can present his or her answer for evaluation, while white flag 50 is waved when a correct answer is given. Flags 50 and 51, plus an accurate timing device 40 are a great help in operating the progress of game of the invention as will be explained below.

The rules and method of the game of the present invention will now be explained in detail with respect to a preferred mode of play of such game. By way of example, the game as explained is intended to be an effective and efficient aid to learning the multiplication or so-called "times" tables from "1×1" to "10×10", which times tables are repeated on answer chart 30, best shown in FIG. 5. In the presently described game embodiment, as illustrated the "table of results" 70 in FIG. 6 having in the first column 72 the possible results to the mathematical operations in the multiplication tables from "1×1" to "10×10", and in the second column 74 the number of times such result is repeated in the "1×1" to "10×10" multiplication tables. There are forty-two different possible different results, many of which are repeated multiple times, for a total of one hundred mathematical result cards. Thus, in the illustrated game embodiment, there will also preferably be provided one hundred mathematical operation cards corresponding to said one hundred result cards. In the lower section of the table of results, a second table 78 is shown for the times tables from "1×1" to "10×5", having an according lesser number of possible results. As shown in FIGS. 1 and 4, instruction sheet 60 is preferably kept in close proximity to the game during play particularly when the judge is fairly new in enumerating the accepted rules of the game.

In order to initiate game play with the game of the invention, one of the players is appointed to act as the Judge, either by turn or via another random selection process. Such person will usually set up the game, with or without the aid of the other players, and is given the decks of mathematical operation and result cards 10 and 20, one deck serving as the deck of "question" cards and the other deck serving as the deck of "answer" cards for such game. The judge (g) is also provided with the "answer chart" 30, timing device 40, and white and red flags 50 and 51. Alternatively, as indicated above a judge who does not actively participate in game play may also be appointed, such as a parent or adult when the game is played by a group of children or the like.

The game may be played preferably with between three and eleven players. In the preferred embodiment currently being described, the "Answer" cards are designated as the deck or set of result cards 20, which are shuffled, and then a plurality of such cards is dealt to each of the players. While the number of "Answer" cards dealt to each player can vary, it is preferred that if there are two to five players, each player will be dealt either ten or fifteen "Answer" cards; if there are six to eight players, each player will be dealt ten "Answer" cards; and if there are nine to eleven players, each player will be dealt eight "Answer" cards. The unused "Answer" cards are placed on a table with their front surface facing upward. In addition, the deck of "Question" or operation cards 10 is also placed on a table with their front surface facing upward, so that the mathematical operations on the back surface of the cards are not visible. The Judge will then select a "Question" card and turn it over, and will preferably also place such card on the middle of the table so that it is visible to all of the players. In addition, the Judge will preferably read the mathematical operation aloud, and at the same time activate the timing device. Each of the players after seeing or hearing the mathematical operation question will quickly scan his or her hand of "Answer" cards to determine whether any of such cards contains the correct result to such mathematical operation question. Then, any player having the correct result will place such "Answer" card face up on the table or in a designated area as quickly as possible, preferably within the time period set on the timer device. Since as illustrated in the table of results in FIG. 6 depending upon the mathematical question, there may be more than one "Answer" card containing the correct result to a mathematical operation question, if two or more players have an "Answer" card with a correct numerical result, the players will essentially race to place such card on the table or in the discard area, with only the first player to do so being allowed to discard such card, while the other player or players having the correct result must take their "Answer" card back. The Judge will then confirm whether or not the player has answered the question correctly, and once confirmed the Judge will then continue play by revealing a new "Question" card.

To ensure and maintain speed and excitement with the game, the timing device is preferably set for a relatively short time, preferably less than thirty seconds, and more preferably approximately fifteen seconds. If time ends and no players throw or reveal an "Answer" card having the correct result to the mathematical operation question, either because none of such players has the correct answer card or one or more players do not recognize that one of their "answer" cards contains the correct result, at the end of such time the Judge will preferably pick up or show the white flag and say verbally "TIME", indicating that such round has ended. The Judge will then repeat the correct answer verbally, referring to the answer chart or table if necessary. Thus, all of the players will be informed as to the correct numerical result to each mathematical operation question regardless of whether any of the players has an "Answer" card containing the correct result, so that all participants can learn such correct answers.

If a player throws down a card having an incorrect result, the Judge will wait until the timer device has expired, and then give the verbal "TIME" sounding, and then will preferably hold up the red flag, which is indicative that an incorrect answer was given. The Judge will then, referring to the answer chart if necessary, read the correct result aloud. In addition, the player who threw down the incorrect card must take back his or her card, and in addition will be further penalized by having to also take two or more "Grounded Cards", which are essentially the extra or leftover "Answer" cards. The number of "Grounded Cards" by which a player will be penalized for an incorrect answer may be 1, 2, 3, or 4 and will be agreed upon among the player prior to commencing play. As play continues, in each round the players will compete to be the first to correctly answer the questions by placing or revealing a correct "Answer" card. The first player to turn in and thus get rid of all of his or her cards is declared the winner. If the game is to be played by younger students, it may be advantageous to limit the number of players to no more than four or five in order to maintain interest. Sometimes it will also be advisable to limit the number of cards in play with younger players in order not to have such younger players feel overwhelmed. As they become used to the play, the number of cards in play can be increased.

It will be understood that the number of "Answer" cards dealt to the players may be varied, depending upon the number of players, as well as the number and type of multiplication or other operations being learned. In addition, while in the exemplary embodiment described, the deck of "Answer" cards includes an answer for each "Question" card, the number of "Question" and "Answer" cards may be different or varied. In addition, it is not necessary that every math factor within a range be represented or represented equally, and in fact some values such as, for example, 1×1, which may be considered too easy, need not be present in the deck at all.

In case as was mentioned previously it is desired to play the game in the reverse order or backwards from the above description, the operation cards 10 will be dealt to the players in appropriate numbers and the judge will serially display the result cards 20 to the players whereupon the players will attempt to dispose of their operation cards 10 by matching such mathematical operations with the result displayed on the result cards 20 by the judge, the aim of each player being in such "reverse" play to dispose of all their operation cards just as it is the aim of the players to dispose of all their question cards in the forward method of play. As indicated above, if the game play is altered for forward play to reverse play in a "double" game or games played one after another, the players will gain additional practice in their mathematical functions and thus will have even better recall of the mathematical functions and equations. It will also likely be found that some players will win more frequently with a forward game than other players and different players will win more frequently with a reverse game, providing a faster element of competition to the game and more interest overall, although the "chance" mechanism of the game ensures that the most mathematically skilled players will not continually win all the time. A scoring method for determining the overall winner of several sequential games, as opposed to the winner if the individual games, may also be provided. For example, the judge may be provided with a table or the like wherein each of the players is listed in one column, and the rows would contain the number of cards remaining at the end of each game for each player. Then, at the end the number of cards remaining in each round would be totaled for each player, and the player having the fewest number of cards left overall would be declared the overall winner. If will be evident to those skilled in the art that other methods for keeping track of the individual scores of the players and then determining an overall winner may be provided. For example, a handicap feature based on the age or level of education may also be introduced into the game, where a younger person may be dealt a fewer number of cards than an adult or the like, although it is also believed that the chance feature of the game is in most cases sufficient to provide a mostly even playing field for all of the players.

In additional embodiments, the card game of the present invention can be played through electronic or computerized formats in accordance with a computer program operable to provide the desired game environment. For example, the card game may be played on or through a computer in an embodiment of the invention. In such illustrative embodiment, the game may comprise either networked and unnetworked versions of gameplay. In the unnetworked version, the game may include a single player mode, where the single player plays against himself, as well as against a single or plurality of computerized Artificial Intelligence (AI) player(s), which simulate card playing against another or multiple other players.

In additional embodiments, the networked version of the game is similar to the unnetworked version described above, except the player can connect with other players through the internet using a gaming or social media account to identify himself or herself. In this embodiment, the use of AI(s) are not necessary for gameplay, as the player can connect with other human players, although such AI feature is still an envisioned element of the invention.

In additional embodiments, the game could be played on other types of electronic devices other than a computer. For example, the game may be played on a smartphone, a personal digital assistant (PDA), a tablet computer, or other mobile device and the like. It can additionally be played through a gaming console hooked up to a LCD/LED screen, or like television screen. It could also be played on an electronic device which has been specifically adapted for the game, like a handheld game playing device. It should also be mentioned that embodiments of the invention include the both the unnetworked and networked versions of the game to be playable on the devices mentioned above, with the networked version being made possible if/when such devices are capable of internet connectivity. It will be recognized therefore that a computer program written to facilitate the play of the present invention may be of a variety of types and include a variety of elements, such as means of representing the playing environment, including the playing surface, representations of the playing cards, representations of dealing of the cards, representations of the time, means by which a player may communicate an intention to accept one or more cards as a possible correct answer, means by which the player is informed whether the answer is correct or incorrect including the display of a colored flag, as well as level of skill and other playing options offered to the player.

Figure 7I:
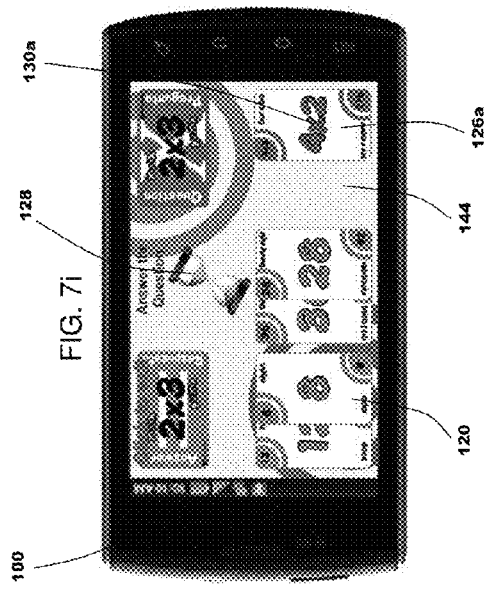
FIGS. 7a-7n illustrate a mobile device or smartphone showing exemplary interfaces associated with the various stages of an electronic version of game play in accordance with a preferred embodiment of the game of the present invention.
Figure 7J:
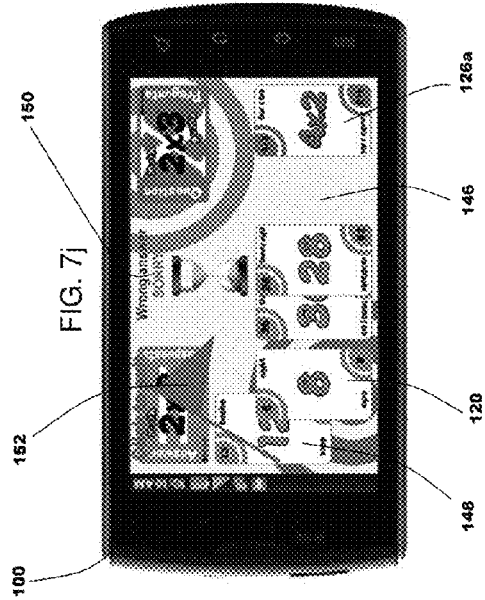
Figure 7K:
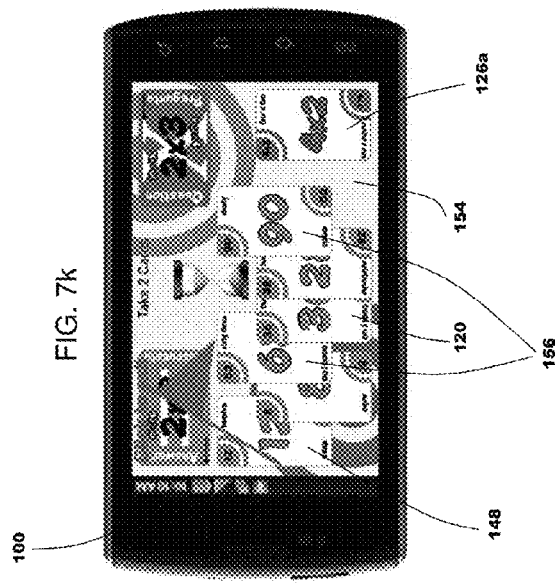
Figure 7L:
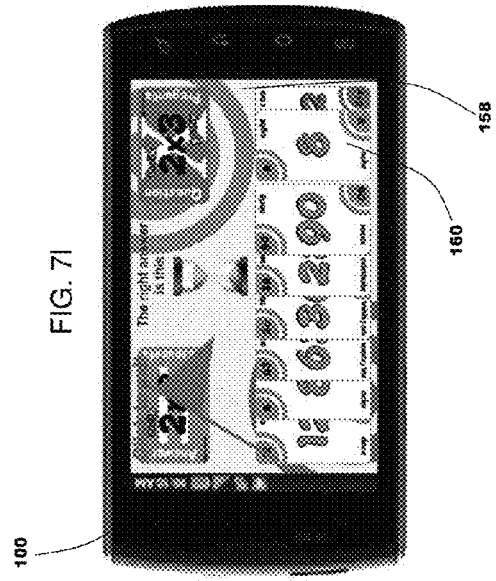
Figure 7N:
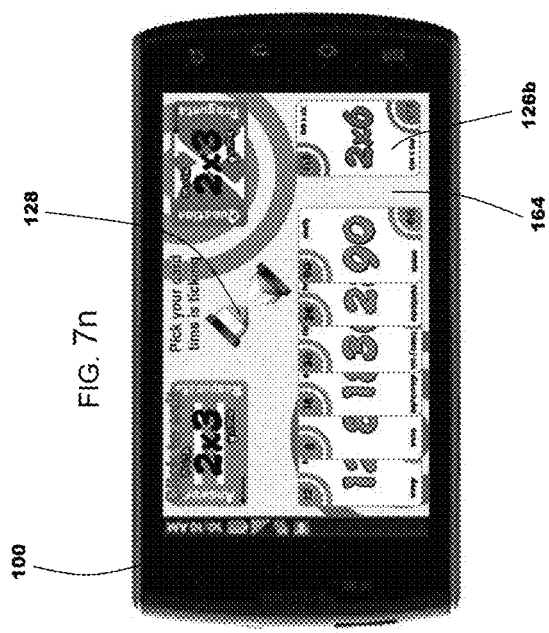

As shown in FIGS. 7a-7n, a mobile device namely a smartphone 100 showing exemplary interfaces associated with the various stages of an electronic version of gameplay is illustrated in accordance with a preferred embodiment of the game of the present invention. FIG. 7a depicts an exemplary startup screen 102 of the game in an electronic format. As shown, a "Play" button 104 is included, which initiates the start of a game when pressed. Also included are an "Exit" button 106 to exit the game program. FIG. 7b shows a subsequent level-select screen 108, in which a player is prompted to choose a difficulty of gameplay or game level. A "Beginner" 110 and an "Advanced" 112 level is included, however additional and/or a wider range of difficulty levels, such as "Intermediate" and/or "Expert" levels may also be included.

FIG. 7c depicts an exemplary screenshot 114 of a game at its commencement. As shown, a "Click to Deal" button 114 is included. The pressing of the "Click to Deal" button 116 initiates the dealing of a plurality of answer game cards. FIG. 7d illustrates an exemplary intermediate screen 118 where the answer game cards 120 have been dealt to the player, but prior to the actual dealing of the question game card. As shown, a sandclock button 122 appears to alert the player to get ready for the actual dealing of the question card. Once the player is ready, the player clicks the sandclock button 122 and the game timer begins.

FIG. 7e shows an exemplary screen 124 in which game card or question card 126 has been dealt and is in play with the timer 128 running. As shown, the game card 126 in play includes a mathematical equation 130, with various answer choices in the form of dealt cards 120 presented alongside of the card in play. The player must then decide which answer card to choose, as quickly as possible. FIG. 7f illustrates a screenshot 132 of a selected answer choice 134 which comprises one of the answer cards 120. Whichever card 120 that is selected as the answer 134 by the player gets tabbed over the other answer choices as to differentiate it from the unchosen answer choice cards 120. As shown in FIG. 7f, the correct answer choice has been chosen by the player. FIG. 7g illustrates a feedback confirmation screen 136, responding to the answer choice card selected by the player. As shown, the correct answer card 134 is displayed over the question card 126, and a congratulatory message 138 appears, as well as a colored flag 140, which in one embodiment is green, which confirms the player's correct answer choice 134 as chosen and shown in FIG. 7f.

Figure 7M:
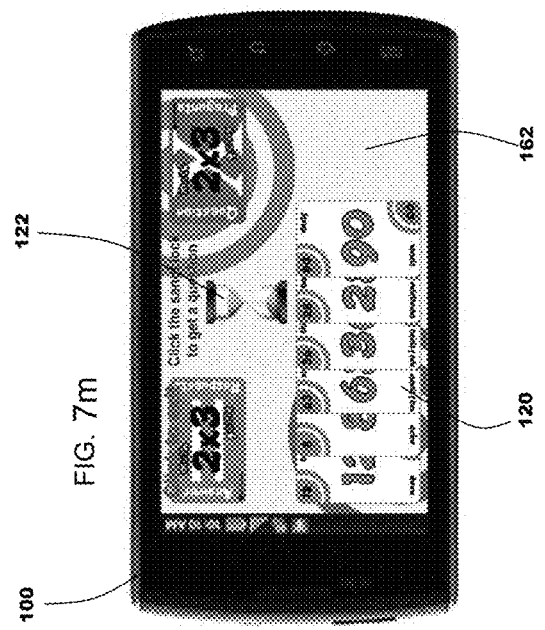

FIG. 7h depicts an exemplary intermediary screen 142 prior to the next game card being dealt. It may be noted that this screen resembles the screen depicted in FIG. 7d, as the upright sandclock button 122 appears again, alerting the player to get ready for the next actual dealing of the question card. Once the player is ready, the player clicks the sandclock button 122 and the game timer 128 begins. FIG. 7i depicts a screenshot 144 of another question card 126a in play with a timer 128 running. Like the screenshot shown in FIG. 7e, another question card 126a with another mathematical equation 130a is presented, with various remaining answer choice cards 120 presented alongside the question card 130a in play. As shown in screenshot 146 in FIG. 7j, this time a wrong answer card 148 has been selected, along with a message 150, as well as a flag 152 having a different color than right answer flag 140 shown in FIG. 7g, and in one embodiment being colored red. FIG. 7k is a screenshot 154 which illustrates the penalty for selecting or choosing a wrong answer, namely, the player must keep the wrong answer card 148, and in addition the player is dealt two (2) additional answer cards 145 which get added into the answer choice cards 120. FIG. 7l illustrates an exemplary screenshot 158 of the unchosen correct answer 160 being pointed out to the player. FIG. 7m illustrates the game interface 162 of start of the next iteration of game card questions. Similar to the screenshots shown in FIGS. 7d and 7h, the sandclock button 122 appears again, alerting the player to get ready for the next actual dealing of the question card, and a new set of answer cards 120 is displayed. Once the player is ready, the player clicks the sandclock button 122 and the game timer 128 begins. FIG. 7n depicts another question card 126b in play with a timer 128 running. Like the screenshots shown in FIGS. 7e and 7i, another question card with another mathematical equation is presented, with various answer choice cards presented alongside the question card in play. Game play may continue until either a certain number of correct answers is provided, but in a preferred embodiment continues until all of the player's answer cards 120 are gotten rid of by the player by selecting correct mathematical equation answers. In another embodiment, the mathematical operation cards will comprise the answer cards, and the mathematical number cards will comprise the question cards, whereby the players must select a correct mathematical operation that results in the displayed mathematical number.

It should also be evident that while the invention has just been described with respect to a game to aid in quick recall of the multiplication or so-called times tables, the same principles can be used for the teaching of other mathematical functions such as learning division, powers, multiplication and the like. Nevertheless, it is the teaching of the multiplication tables, which is currently a problem in schools and normal life situations.

While the present invention has been described at some length and with some particularly with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

In addition, while various embodiments of methods for playing a card game, as well as decks of cards constructed according to the principles disclosed herein, have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

I claim:

1. A math operation practice and learning game comprising:
   (a) a first set of cards each having at least one mathematical operation question thereon;
   (b) a second set of cards each having at least one mathematical operation answer thereon that corresponds to at least one mathematical operation question on one of the cards in the first set of cards;
   (c) a chart containing a list of the math operation answers which correspond to the math operation questions in the first set of cards;
   (d) a timer device;
   (e) a first flag having a first unique indicia thereon and being useable during game play to indicate when no cards in the second set of cards having a correct mathematical operation answer to a mathematical answer question on one of the first set of cards have been presented, and
   (f) a second flag having a second unique indicia thereon and being useable during game play to indicate when an incorrect answer to a mathematical operation question on a card in the first set of cards has been given, wherein the object of the game is to be the first player to discard all of his or her cards in the second set of cards.

2. The math operation teaching game of claim 1 wherein said mathematical operation questions on said first set of cards are taken from the group consisting of addition, subtraction, multiplication and division.

3. The math operation teaching game of claim 2 wherein said mathematical operation questions on the first set of cards are related to multiplication.

4. The math operation teaching game of claim 2 wherein said mathematical operation questions are related to division.

5. The math operation teaching game of claim 2 wherein said mathematical functions are related to addition.

6. The math operation teaching game of claim 2 wherein said questions on the cards are related to subtraction.

* * * * *